Oct. 27, 1936.    W. F. MERRITT    2,059,133
SANDWICH COOKER
Filed March 29, 1935    2 Sheets-Sheet 1
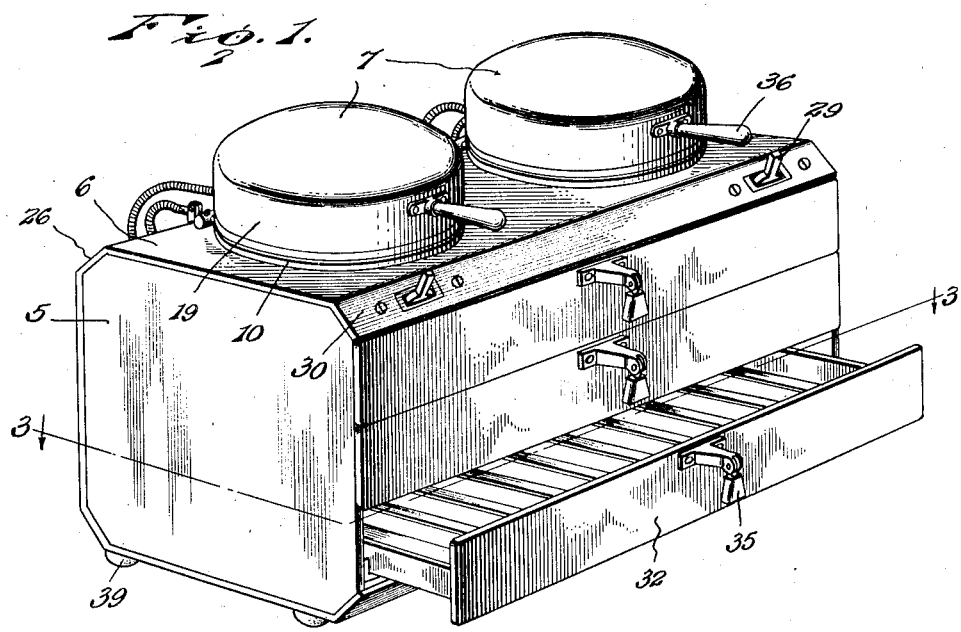
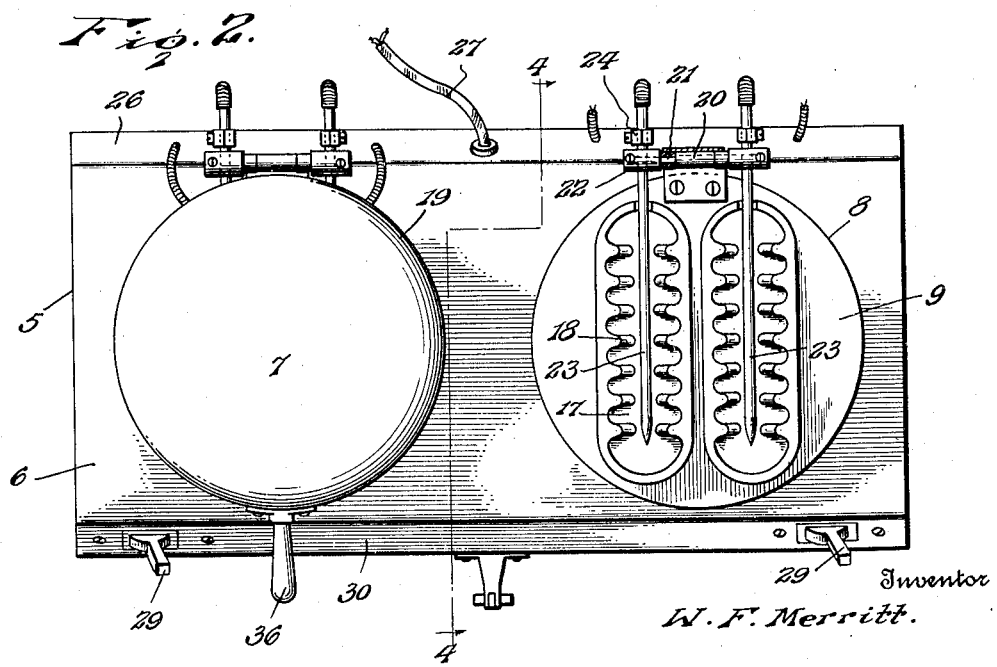
Inventor
W. F. Merritt.
By Lacey & Lacey,
Attorneys Oct. 27, 1936.  W. F. MERRITT  2,059,133
SANDWICH COOKER
Filed March 29, 1935   2 Sheets-Sheet 2
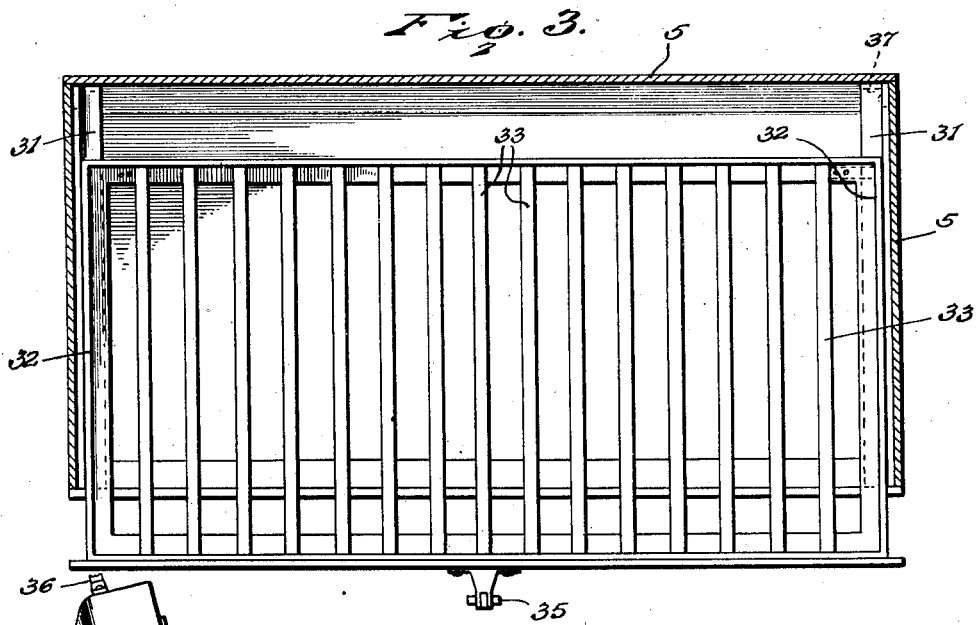
Fig. 3.
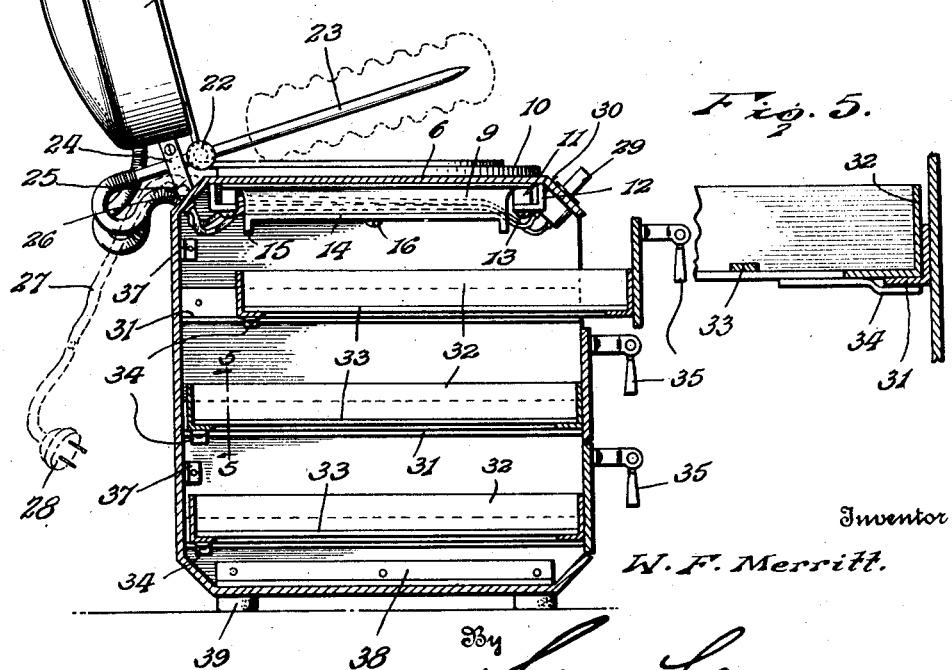
Fig. 4.
Fig. 5.
Inventor
W. F. Merritt.
By Lacey & Lacey,
Attorneys Patented Oct. 27, 1936

2,059,133

UNITED STATES PATENT OFFICE 2,059,133

SANDWICH COOKER

William F. Merritt, New York, N. Y.

Application March 29, 1935, Serial No. 13,744

7 Claims. (Cl. 219—19)

This invention relates to electric cookers of that general class especially adapted for cooking wienerwursts in enveloping batter to form sandwiches.

The object of the invention is to provide a comparatively simple, inexpensive and thoroughly practical device of this character in which the cooking units are connected with and supported on a warming oven or cabinet in such a manner that the heat from said units may be utilized for keeping the cooked sandwiches within the oven warm and in an edible and salable condition for an indefinite period.

A further object of the invention is to provide a warming cabinet or oven including a plurality of sliding drawers or trays movable to open position at the front of the cooking units so as to permit the cooked sandwiches to be quickly and conveniently transferred from the food impaling members of the cooking units to the warming trays for future sale without unnecessarily subjecting said sandwiches to the cooling influence of the atmosphere.

A further object is to provide means mounted on the pivot or hinge of the movable section of the cooking unit for elevating the free end of the food impaling member and to so construct the batter receiving cavities as to insure uniform baking or cooking of a wienerwurst and its enveloping batter.

A still further object of the invention is to generally improve this class of devices so as to increase their utility, durability and efficiency.

In the accompanying drawings forming a part of this specification and in which similar numerals of reference indicate corresponding parts in all the figures of the drawings, Figure 1 is a perspective view of an electric cooking apparatus embodying the present invention, one of the trays or drawers being shown in partially open position, Figure 2 is a top plan view thereof, the movable section of one of the cooking units being removed in order to show the construction of the batter receiving cavities, Figure 3 is a horizontal sectional view, taken on the line 3—3 of Figure 1, Figure 4 is a vertical sectional view, taken on the line 4—4 of Figure 2, Figure 5 is a detail vertical sectional view of the rear portion of one of the drawers or trays showing the construction of the guide or keeper.

The present invention is an improvement on the sandwich cooker shown in my prior U. S. Patent No. 1,990,412, and comprises a cabinet or warming oven 5, preferably rectangular in shape, and constructed of metal or other suitable material, the top 6 of said cabinet forming a support for the electrical cooking units, two of which are shown and indicated at 7. The top 6 of the cabinet is provided with circular recesses or openings 8 which receive the stationary sections 9 of the electric cooking units 7, the upper portions of said stationary sections 9 being provided with circumferential flanges 10 adapted to bear against the upper surface 6 of the cabinet, as shown, and center the units therein. The stationary sections 9 project within the cabinet or oven 5 and are provided with the usual electrical heating elements, not shown, said stationary sections being retained in position on the cabinet by means of lugs 11 formed integral with and depending from the sections 9 and engaged by suitable clamping brackets 12. The clamping brackets 12 are preferably angular in shape, one end of each bracket being secured to the adjacent lug 11 by a screw 13 and the other end thereof extending upwardly and bearing against the inner face of the cover 6, as best shown in Figure 4 of the drawings. The resistance coils or other heating elements are retained within the lower sections 9 by means of detachable closure plates 14 having depending reinforcing flanges 15 between which are positioned screws or similar fastening devices 16, said plates 14 serving the dual function of closures for the lower sections 9 and as a means for retarding downward radiation of the heat from said heating elements. The stationary sections of the cooking elements are provided with mold cavities 17, the walls of which are preferably scalloped or corrugated at 18 so as to insure uniform cooking of the batter when placed within the mold cavities. Pivotally connected with the stationary mold sections 9 of the cooking units are movable mold sections 19 having batter receiving cavities formed therein corresponding in size and shape to the cavities 17 and adapted to register therewith when the movable sections are swung downwardly to closed position. The mold sections are connected by a hinge 20 which fits around a pivot pin 21 arranged at the rear of the cabinet, and mounted on the extended ends of said pivot pin 21 to turn therewith are sleeves 22 carrying food impaling members 23 which serve to center a wienerwurst or sausage within the mold cavities during the baking of the batter and these impaling members are also provided with interior electrical heating elements, not shown, for cooking the sausage. Secured to the ends of the impaling members 23 are stop lugs 24, the lower ends of which are beveled at 25 and adapted to bear against the rear beveled edge 26 of the warming oven or cabinet for limiting the swinging movement of the movable sections of the cooking units when the latter are swung to open position.

Extending from the rear of the cabinet is an electrical conductor 27 having a terminal plug 28 adapted to be inserted in a wall socket or other suitable switch for conveying current from a source of supply to the heating elements of the cooking units and the impaling members, respectively, there being suitable switches 29 projecting through the forward inclined or beveled edge 30 of the warming oven, as shown, and operatively connected with the heating elements of the cooking units and the conductor 27, respectively, for controlling the flow of current to either or both cooking units.

Extending transversely of the interior of the warming oven or cabinet 5 are angular guide cleats 31 on which are slidably mounted suitable drawers or trays 32 each preferably consisting of a substantially rectangular frame connected by spaced transverse bars 33 on which the cooked sandwiches are adapted to rest when removed from the food impaling members. The rear end of each drawer is provided with a guide finger 34 which extends beneath the lower flange of the adjacent cleat and serves to prevent downward tilting of the drawer when moved to open position. The front of each drawer is preferably provided with a pendant handle 35 to facilitate withdrawal thereof, and the movable sections of the cooking units are also provided with handles 36 preferably projecting slightly beyond the front of the cabinet so that they can be readily grasped by the operator when opening and closing the movable sections. The cabinet or oven is preferably reinforced and strengthened by the provision of angular corner cleats 37, and transverse reinforcing cleats 38 form a connection between the bottom of the cabinet and the side walls thereof, as shown.

It will here be noted that, owing to the fact that the bars 33 of the drawers or trays are spaced apart, the air heated by the plate 14 will circulate freely between the trays and around the sandwiches thereon so as to keep said sandwiches warm and in an edible and salable condition at all times. It will further be noted that the drawers or trays are movable to open position directly in front of the impaling members 23 so that, after a sandwich has been cooked, the cooked sandwich may be readily transferred from the impaling member to any selected tray or drawer without the necessity of unduly exposing the sandwich to the cooling influence of the atmosphere. The bottom of the warming oven is preferably provided with resilient pads or feet 39 so as to permit the device to rest on a table, counter, or other polished support without marring the same.

In operation, the upper sections 19 are swung to open position, thereby elevating the points of the impaling members. The cavities in the lower sections 9 are then filled, or partially filled, with batter or other material from which the roll or sandwich is to be baked and a wienerwurst, frankfurter or other kind of meat impaled on each of the members 23 and the upper section 19 swung downwardly to closed position. As the stationary sections swing downwardly, they will engage the impaling members and center the wienerwursts within the lower cavities and if either switch 29 is then turned on the current will flow through the heating elements and the sandwich or sandwiches will be thoroughly cooked. After the sandwiches have been cooked, the switch is turned off and the upper section 19 moved to open position, thereby causing said upper section to bear against the stop lugs 24 and tilt the front ends of the impaling members upwardly so that the cooked sandwiches will be presented in convenient position for removal at the front of the cabinet. When business is brisk, the sandwiches may be dispensed to the customers directly from the impaling members, but, should the volume of sales diminish, so that the supply is greater than the demand, the drawers or trays are moved to open position and the cooked sandwiches transferred directly from the impaling members into said trays where they can be conveniently kept at the desired temperature so as to always have a supply on hand for immediate delivery should customers desire the same.

It will thus be seen that there is provided a unitary structure in which the warming oven forms a support for the cooking units and the heat from the cooking units is utilized for maintaining the cooked sandwiches at the proper temperature and in a sanitary and edible condition at all times. Furthermore, inasmuch as the cookers are mounted on the oven, the device may be conveniently moved as a unit from place to place, thereby dispensing with independent warming ovens and similar devices heretofore used for this purpose.

It will, of course, be understood that, if desired, several seating openings may be formed in the top of the cabinet so as to permit the use of a gang of cooking units and that the shape of the cabinet and the details of construction thereof may be varied without departing from the spirit of the invention.

Having thus described the invention, what is claimed as new is:

1. A sandwich cooker comprising a cabinet having openings in the top thereof, heating elements seated in said openings and provided with flanges bearing against the top of the cabinet, lugs depending from the heating elements, clamping brackets each having angularly disposed arms, one of which is secured to the adjacent lug and the other bears against the lower surface of the top of the cabinet, trays slidably mounted in the cabinet below the heating elements and adapted to receive cooked sandwiches, and means between the trays and heating elements for retarding downward radiation of the heat.

2. A sandwich cooker comprising a cabinet having openings in the top thereof, electrically heated cooking units seated in the openings, food impaling members forming a part of the cooking units and movable to operative position at an angle to the top of the cabinet, sandwich receiving trays slidably mounted in the cabinet and movable to open position at the front of the cabinet beneath the impaling members to receive the cooked sandwiches therefrom, and means for retarding downward radiation of the heat from said cooking units.

3. A sandwich cooker comprising a cabinet having openings in the top thereof, electrical cooking units seated in said openings and including food impaling members movable to operative position with their free ends adjacent the front of the top of the cabinet for supporting a cooked sandwich at an angle to said top, trays slidably mounted within the cabinet beneath the impaling members and provided with spaced transverse bars adapted to receive the cooked sandwiches from the impaling members, and means for retarding downward radiation of the heat from said cooking units.

4. A sandwich cooker comprising a cabinet having openings in the top thereof, cooking units seated in said openings and including relatively stationary and movable sections having batter-receiving cavities, the walls of said cavities being corrugated, food impaling members interposed between said sections and movable to a position at an angle to the top of the cabinet when the movable sections are in open position, trays slidably mounted in the cabinet beneath the cooking units and adapted to receive sandwiches from the impaling members, and means for retarding downward radiation of heat from said cooking units.

5. A sandwich cooker comprising a cabinet having an inclined face at the rear thereof, electrically heated cooking units supported by the cabinet and including pivotally united sections having batter receiving cavities, food impaling members interposed between said sections and mounted on the pivot pin thereof, stop lugs carried by the rear ends of the impaling members and adapted to bear against the inclined face of the cabinet when the sections are moved to open position and elevate the impaling members, trays slidably mounted in the cabinet and movable to open position near the free ends of the impaling members and adapted to receive the food from said impaling members, and means for retarding downward radiation of heat from said cooking units.

6. A sandwich cooker comprising a cabinet having an opening in one wall thereof, an electrically heated cooking unit seated in the opening, a food impaling member forming a part of the cooking unit and movable to operative position at an angle to the wall having the opening therein, a sandwich receiving tray slidably mounted in the cabinet and movable to open position at the front of the cabinet beneath the impaling member to receive a cooked sandwich therefrom, and means for retarding downward radiation of heat from said cooking unit.

7. A sandwich cooker comprising a cabinet having an inclined portion at the rear thereof, an electrically heated cooking unit supported by the cabinet and including pivotally united sections having batter receiving cavities, a food impaling member interposed between said sections and mounted on the pivot thereof, a stop lug carried by the rear end of the impaling member and adapted to bear against said inclined portion when one of the sections is moved to open position and elevate the impaling member, a tray slidably mounted in the cabinet and movable to open position near the free end of the impaling member and adapted to receive the food from said impaling member, and means for retarding radiation of heat from said cooking unit.

WILLIAM F. MERRITT.